United States Patent Office 3,341,618
Patented Sept. 12, 1967

3,341,618
ISOMERISATION PROCESS AND CATALYST
Kenneth Hugh Bourne and Arnold Fisher, Sunbury-on-Thames, England, assignors to The British Petroleum Company Limited, London, England, a corporation of England
No Drawing. Filed June 18, 1964, Ser. No. 376,250
Claims priority, application Great Britain, Aug. 22, 1963, 33,278/63
15 Claims. (Cl. 260—683.2)

This invention relates to a novel catalyst, to a process for preparing the catalyst and to a process for the isomerisation of hydrocarbons using the catalyst.

According to one aspect of this invention there is provided a catalyst consisting essentially of at least two ionic metal compounds carried on a cation exchange inorganic support, at least one of the compounds being a compound of a metal of Group I–A and at least one of the compounds being a compound of a metal of Groups II–VIII of the Periodic Table according to Mendeleef, the weight of the compound or the total weight of the compounds of the metal or metals of Group I–A being greater than 0.05% and less than 1.0% by weight and the weight of the compound or the total weight of the compounds of the metal or metals of Groups II–VIII being greater than 0.01% by weight and less than 3.0 by weight, each percentage being expressed as a percentage of the weight of the support.

By cation exchange inorganic support we mean an inorganic support which is capable of bearing cations which when borne are capable of being replaced by other cations.

The preferred cation exchange inorganic support is silica gel prepared from an aqueous solution of a silicate, for example sodium silicate by hydrolysis of the silicate. The gel formed in this way will contain hydrogen atoms in surface hydroxyl groups capable of ionising and exchanging.

Other suitable supports include titania and zirconia gel prepared in a similar manner.

Preferably the support has a surface area greater than 200 square metres per gram.

The preferred compounds of the Group I–A metal are those of sodium. The most preferred sodium compounds are the neutral and basic salts of sodium.

By neutral salts we mean those salts which are neutral to litmus, for example sodium sulphate. By basic salts we mean those salts which are alkaline to litmus, for example sodium bicarbonate.

The preferred compounds of the metal or metals of Groups II–VIII are the sulphates and chlorides, most preferably the sulphates, of magnesium, aluminium, manganese and cobalt.

According to another aspect of the present invention there is provided a process for the production of a catalyst which process comprises contacting a cation exchange inorganic support bearing replaceable cations of a metal of Group I–A, ammonium ions or protons, with a solution containing a compound selected from a second group of compounds consisting of metals of Groups II–VIII under conditions such that cation exchange takes place on the support between cations of the first group and cations of the second group to form a catalyst base and contacting the catalyst base with a solution of Group I–A metal compound under such conditions that ions of the Group I–A metal compound are deposited onto the base.

Suitable supports may be prepared as hereinbefore described.

The catalyst base may be prepared by treating the support with an excess of the salt in solution form. The support may then be extracted with a suitable solvent, for example water, until no more salt is washed from the support.

Alternatively the catalyst base may be prepared by allowing the support to stand in a solution of the salt for a length of time, for example overnight. Residual liquor is then decanted from the support. The resulting material may then be extracted as described above.

Preferably the solvent for the Groups II–VIII metal salt is water. Other ionic liquids may be used, however.

The catalyst may then be prepared by allowing the catalyst base to stand in the solution of the Group I–A metal salt for a length of time, for example three hours. Residual liquor is then decanted from the catalyst which is thereafter dried.

Preferably the solvent for the Group I–A salt is water. Other ionic liquids may be used, however.

Preferably the solution is dilute.

Most preferably the concentration of the solution is below 0.1 mole/litre.

According to another aspect of this invention there is provided a process for the isomerisation of an olefinic hydrocarbon which is capable of undergoing double bond shift which process comprises contacting the hydrocarbon with a catalyst as hereinbefore described.

The feedstock to the process according to the invention may be any olefinic hydrocarbon capable of undergoing double bond shift. Thus there may be used acyclic hydrocarbons. If desired, cyclic hydrocarbons may be employed; in general, these are more easily isomerised than acyclic hydrocarbons.

Preferably the process is carried out with the feedstock in vapour phase.

Preferably the process is carried out at elevated temperature, most preferably in the range 50° to 600° C.

Preferably the liquid hourly space velocity of the feedstock is in the range 0.1 vol./vol. to 20 vol./vol.

Preferably the olefin is contacted with the catalyst in the presence of an inert gaseous diluent.

Preferably the molar ratio of olefin to diluent is in the range 0.1:1 to 10:1.

Preferably the feedstock contains less than 20 carbon atoms per molecule, more particularly it is preferred that the feedstock contains 4–6 carbon atoms per molecule. The feedstock may contain a mixture of olefins.

The pressure employed may be sub-atmospheric, atmospheric or super-atmospheric.

By way of illustration, suitable feedstocks include cis- and trans- butene-2 and 4-methylpentene-1.

In general, double bond shift takes place without substantial cracking or skeletal isomerisation.

The invention is illustrated but not limited by the following examples:

Example 1

An aqueous solution of aluminum sulphate was added to silica gel of surface area 550 square metres per gram as determined by the BET method and the mixture was allowed to stand overnight. The silica gel employed was that sold under the trade name "Sorbosil." It had a benzene adsorption value of 0.243 micro-mole benzene per gram silica gel when measured at 193° C. with a benzene partial pressure of 0.1 mm. Hg. The dried material was then extracted with distilled water for eight hours in a Soxhlet extractor. The resulting catalyst base had an aluminium content of 0.11% expressed as a percentage by weight of the total weight of the catalyst base.

The resulting catalyst base was then contacted for a period of three hours with a dilute aqueous solution of sodium bicarbonate containing 0.015 mole/litre. Excess solution was then decanted from the resulting catalyst which was then dried. The catalyst had a sodium content of 0.055% expressed as a percent by weight of the total weight of the catalyst.

4-methylpentene-1 in gaseous phase was passed over 1 ml. bed of the catalyst at a liquid hourly space velocity of 1.0, at a temperature of 400° C. and at atmospheric pressure in the presence of oxygen-free nitrogen as a carrier gas used at a flow rate of 10 ml./minute.

The effluent from the reaction chamber after 3½ hours on stream was analysed by gas liquid chromatography.

The results set out in column 1 of the following table were obtained.

Example 2

The catalyst base hereinbefore described with reference to Example 1 was contacted for a period of three hours with a dilute aqueous solution of sodium sulphate containing 0.005 mole per litre.

Excess solution was then decanted from the resulting catalyst which was then dried.

The catalyst had a sodium content of 0.076% expressed as a percent by weight of the total weight of catalyst.

4-methylpentene-1 was then passed over a 1 ml. bed of the catalyst under the same condition as those described above.

The results set out in column 2 of the following table were obtained.

Example 3

The catalyst base hereinbefore described with reference to Example 1 was contacted for a period of three hours with a dilute aqueous solution of sodium bicarbonate containing 0.05 mole/litre.

Excess solution was then decanted from the resulting catalyst which was then dried.

The catalyst had a sodium content of 0.14% expressed as a percent by weight of the total weight of catalyst.

4-methylpentene-1 was then passed over a 1 ml. bed of the catalyst under the same conditions as those described above with reference to Example 1.

The results set out in column 3 of the following table were obtained.

Example 4

By the way of comparison and not by way of illustration 4-methylpentene-1 in gaseous phase was passed over the catalyst base described with reference to Example 1 under the same conditions described in Example 1.

The results set out in column 4 of the following table was obtained.

TABLE

| Products, percent by wt. | 1 | 2 | 3 | 4 |
| --- | --- | --- | --- | --- |
| 3-methylpentene-1, 4-methylpentene-1 | 3.8 | 4.1 | 9.9 | 3.6 |
| 4-methylpentene-2 | 9.5 | 10.3 | 17.0 | 11.1 |
| 2-methylpentene-2 | 16.9 | 18.0 | 21.3 | 17.3 |
| 2-methylpentene-1 | 11.6 | 10.5 | 16.1 | 9.9 |
| 3-methylpentene-2 | 26.0 | 27.7 | 27.6 | 23.1 |
| Dimethyl butenes, ethylbutenes | 13.7 | 12.7 | 5.3 | 12.2 |
| n-Hexenes | 13.5 | 14.3 | 2.8 | 13.3 |
| Cracked products | 5.0 | 2.4 | -------- | 9.5 |

Example 5

Butene-2 (90% by volume cis and 10% trans) in gaseous phase and at a flow rate of 1000 vol./vol./hour was passed over a 5 ml. bed of the catalyst base described with reference to Example 1 in the absence of any diluent and at a steadily increasing temperature. The maximum temperature at which little cracking and/or skeletal isomerisation occurred was found to be 350° C.

The effluent from the reaction chamber at 350° C. was analysed by gas liquid chromatography and was found to be as follows:

| | Mole Percent |
| --- | --- |
| Cracked products | 0.1 |
| Isobutene | 1.3 |
| Butene-1 | 20.1 |
| Butene-2 | 78.5 |

Example 6

The catalyst base was treated in a similar manner as that described with reference to Example 2 with a 0.005 mole/litre solution of sodium sulphate to produce a catalyst having a sodium content of 0.062% by weight.

Butene-2 (90% by volume cis and 10% trans) was then passed over the catalyst in a run similar to that described with reference to Example 5.

The maximum temperature at which little cracking or skeletal isomerisation occurred was found to be 400° C.

The effluent from the reaction chamber at 400° C. was found to be:

| | Mole percent |
| --- | --- |
| Cracked products | 0.1 |
| Isobutene | 1.1 |
| Butene-1 | 21.3 |
| Butene-2 | 77.5 |

Example 7

The catalyst base was then treated in a similar manner to that described with reference to Example 2 with a 0.02 mole/litre solution of sodium sulphate to produce a catalyst having a sodium content of 0.11% by weight.

Butene-2 (90% by volume cis and 10% trans) was then passed over the catalyst in a run similar to that described with reference to Example 5.

The maximum temperature at which little-cracking or skeletal isomerisation occurred was found to be 500° C.

The effluent from the reaction chamber at 500° C. was found to be:

| | Mole percent |
| --- | --- |
| Cracked products | 0.1 |
| Isobutene | 2.0 |
| Butene-1 | 25.2 |
| Butene-2 | 72.7 |

Example 8

By way of comparison and not by way of illustration, butene-2 was passed over the catalyst base described with reference to Example 1 under the conditions described in Example 5.

The effluent from the reaction chamber at 300° C. was found to be:

| | Mole percent |
| --- | --- |
| Cracked products | 0.1 |
| Isobutene | 0.3 |
| Butene-1 | 19.1 |
| Butene-2 | 80.5 |

We claim:

1. A catalyst for use in the isomerization of hydrocarbons consisting essentially of aluminum ions free of associated anions, and ions of a Group IA metal, said ions carried on a cation exchange support selected from the group consisting of silica, titania and zirconia supports, the weight of the aluminum ions being less than 3.0% and the weight of the Group IA ions being greater than 0.05% and less than 1.0% by weight, each percentage being expressed as a percentage of the weight of the support.

2. A process for the production of a catalyst suitable for use in the isomerization of hydrocarbons, which process comprises: contacting a cation exchange support selected from the group consisting of silica, titania, and the zirconia supports, with a solution containing a compound of aluminium under such conditions that cation exchange takes place in the support between the ions of aluminium and the replaceable cations of the support, exhaustively washing the exchanged support until no more anions are removed thereby forming a catalyst base, and contacting said formed catalyst base with a solution of a sodium compound under such conditions that ions of the sodium compound are exchanged with the aluminium of said catalyst base to form a catalyst containing aluminum ions in an amount less than 3.0% and sodium ions in an amount of 0.05–1% by weight of the support.

3. A catalyst according to claim 1 wherein the cation exchange support is silica gel prepared from an aqueous solution of a soluble inorganic silicate by hydrolysis.

4. A catalyst according to claim 1 wherein the support has a surface area greater than 200 m.$^2$/gm.

5. A catalyst according to claim 1 wherein the ion of a Group IA metal is sodium.

6. A catalyst according to claim 2 wherein the sodium compound is selected from the group consisting of neutral and basic salts of sodium.

7. A catalyst according to claim 2 wherein the aluminium compound is selected from the group consisting of aluminium sulphates and chlorides.

8. A process for the isomerisation of an olefinic hydrocarbon which is capable of undergoing double bond shift which process comprises contacting the hydrocarbon with a catalyst according to claim 1.

9. A process according to claim 8 wherein the hydrocarbon is in the vapour phase when contacted with the catalyst.

10. A process according to claim 9 wherein the hydrocarbon is contacted with the catalyst at a temperature in the range 50°–600° C.

11. A process according to claim 10 wherein the hydrocarbon LHSV is in the range 0.1–20 vol./vol.

12. A process according to claim 11 wherein the hydrocarbon is contacted with the catalyst in the presence of an inert gaseous diluent.

13. A process according to claim 12 wherein the ratio of hydrocarbon to diluent is in the range 0.1:1 to 10:1.

14. A process according to claim 13 wherein the hydrocarbon contains less than 20 carbon atoms per molecule.

15. A process according to claim 14 wherein the hydrocarbon contains from 4–6 carbon atoms per molecule.

References Cited

UNITED STATES PATENTS

| | | | |
|---|---|---|---|
| 2,330,071 | 9/1943 | Mattox | 260—683.2 |
| 2,361,755 | 10/1944 | Fawcett et al. | 260—683.4 X |
| 2,423,612 | 7/1947 | Mulligan et al. | 260—683.2 |
| 2,502,565 | 4/1950 | Hoekstra | 260—683.2 |
| 3,104,269 | 9/1963 | Schaffel | 260—683.2 X |
| 3,190,939 | 6/1965 | Benesi | 260—683.65 |

FOREIGN PATENTS 927,970  6/1963  Great Britain.

OTHER REFERENCES

Emmett, Hydrocarbon Catalysis, vol. VI, Reinhold, New York, 1958, pages 74 and 79–81.

DELBERT E. GANTZ, *Primary Examiner.*

R. H. SHUBERT, V. O'KEEFE, *Assistant Examiners.*